US010919630B1

(12) United States Patent
Lee et al.

(10) Patent No.: US 10,919,630 B1
(45) Date of Patent: Feb. 16, 2021

(54) RESTRAINT ASSEMBLY FOR CARGO SYSTEM (71) Applicant: GOODRICH CORPORATION, Charlotte, NC (US)

(72) Inventors: Brandon Lee, Wahpeton, ND (US); Wallace Harold Larson, Jamestown, ND (US); Mark L Olson, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 16/539,224

(22) Filed: Aug. 13, 2019

(51) Int. Cl.
 *B64D 9/00* (2006.01)
 *B60P 7/08* (2006.01)
(52) U.S. Cl.
 CPC .......... *B64D 9/003* (2013.01); *B60P 7/0892* (2013.01); *B64D 2009/006* (2013.01)
(58) Field of Classification Search
 CPC .... B64D 9/003; B64D 9/00; B64D 2009/006; B60P 7/0892
 USPC .......................................................... 410/92
 See application file for complete search history.

(56) References Cited

U.S. PATENT DOCUMENTS

| 3,377,040 A | * | 4/1968 | Hansen | B64D 9/003 |
| | | | | 410/79 |
| 3,693,920 A | * | 9/1972 | Trautman | B64D 9/003 |
| | | | | 410/77 |
| 3,759,476 A | | 9/1973 | Goodwin | |
| 3,986,460 A | | 10/1976 | Voigt et al. | |
| 4,049,286 A | | 9/1977 | Francis, Jr. | |
| 4,077,590 A | | 3/1978 | Shorey | |
| 4,089,275 A | * | 5/1978 | Pelletier | B60P 7/13 |
| | | | | 410/79 |

(Continued)

FOREIGN PATENT DOCUMENTS

| AU | 6712381 | 8/1981 |
| DE | 102010035099 | 2/2012 |

(Continued)

OTHER PUBLICATIONS

European Patent Office, European Search Report dated Apr. 29, 2019 in Application No. 19150916.5.

(Continued)

*Primary Examiner* — Hilary L Gutman
(74) *Attorney, Agent, or Firm* — Snell & Wilmer L.L.P.

(57) ABSTRACT

A restraint assembly includes a base configured to be mounted to a tray of the cargo system, a lateral restraint, and a vertical restraint. The lateral restraint comprises a guide face and a top edge, wherein the lateral restraint is rotatably coupled to the base, according to various embodiments. The vertical restraint extends from the top edge of the lateral restraint, according to various embodiments. The restraint assembly comprises a stored position and a raised position. In the stored position both the lateral restraint and the vertical restraint are configured to be disposed within a volume defined by the tray of the cargo system. In the raised position the vertical restraint and at least the guide face of the lateral restraint are configured to be disposed above the volume defined by the tray of the cargo system to provide guidance and restraint to cargo.

13 Claims, 6 Drawing Sheets

(56) References Cited

U.S. PATENT DOCUMENTS

| | | | |
|---|---|---|---|
| 4,144,821 A * | 3/1979 | Lang | B64D 9/003 410/79 |
| 4,331,412 A | 5/1982 | Graf | |
| 4,395,172 A | 7/1983 | Hoener et al. | |
| 4,457,649 A | 7/1984 | Vogg et al. | |
| 4,867,622 A | 9/1989 | Brown | |
| 5,000,635 A | 3/1991 | Jensen et al. | |
| 5,131,606 A | 7/1992 | Nordstrom | |
| 5,265,991 A * | 11/1993 | Herrick | B64D 9/003 244/118.1 |
| 5,316,242 A | 5/1994 | Eilenstein-Wiegmann et al. | |
| 5,564,654 A * | 10/1996 | Nordstrom | B64D 9/003 244/118.1 |
| 5,573,359 A * | 11/1996 | Moradians | B60P 7/08 410/69 |
| 5,957,406 A | 9/1999 | Nelson | |
| 6,051,133 A | 4/2000 | Huber | |
| 6,270,300 B1 * | 8/2001 | Huber | B60P 7/13 244/118.1 |
| 6,413,029 B1 | 7/2002 | Kernkamp | |
| 6,425,717 B1 | 7/2002 | Saggio | |
| 6,485,238 B2 | 11/2002 | Segura | |
| 6,557,800 B2 | 5/2003 | Medina | |
| 6,729,818 B1 * | 5/2004 | Yee | B60P 7/0815 410/69 |
| 6,926,481 B2 | 8/2005 | Huber | |
| 7,086,517 B2 | 8/2006 | Clos | |
| 7,344,013 B2 | 3/2008 | Krueger | |
| 7,435,043 B2 * | 10/2008 | Brekken | B64D 9/003 410/69 |
| 7,665,938 B2 * | 2/2010 | Schulze | B64C 1/20 410/80 |
| 7,731,460 B2 | 6/2010 | Brown | |
| 7,922,431 B2 * | 4/2011 | Schulze | B64D 9/003 410/80 |
| 8,066,458 B2 | 11/2011 | Schulze et al. | |
| 8,256,602 B2 | 9/2012 | Huber et al. | |
| 8,585,334 B2 | 11/2013 | Moradians | |
| 8,690,103 B2 * | 4/2014 | Schulze | B64C 1/20 244/137.1 |
| 8,926,243 B2 | 1/2015 | Schulze | |
| 9,932,113 B1 | 4/2018 | Larson | |
| 10,106,239 B2 | 10/2018 | Woodland | |
| 10,118,700 B2 | 11/2018 | Kuppan | |
| 10,293,939 B2 | 5/2019 | Conejero Moreno | |
| 2004/0265085 A1 | 12/2004 | Mayer | |
| 2007/0086870 A1 | 4/2007 | Schulze | |
| 2007/0237598 A1 | 10/2007 | Schulze | |
| 2008/0310944 A1 | 12/2008 | Stegmiller | |
| 2010/0143063 A1 | 6/2010 | Dugic | |
| 2011/0150594 A1 | 6/2011 | Schulze | |
| 2012/0037753 A1 | 2/2012 | Huber et al. | |
| 2016/0001870 A1 | 1/2016 | Moradians et al. | |
| 2017/0197717 A1 | 7/2017 | Trisotto | |
| 2018/0222586 A1 | 8/2018 | Shivalinga | |
| 2018/0273177 A1 | 9/2018 | Jayaprakash | |
| 2019/0061945 A1 | 2/2019 | Quixano Mendez | |
| 2019/0210728 A1 | 7/2019 | Pfau et al. | |

FOREIGN PATENT DOCUMENTS

| | | | |
|---|---|---|---|
| EP | 0616938 A1 * | 9/1994 | B61D 45/007 |
| EP | 0881144 | 12/1998 | |
| EP | 0950562 A2 * | 10/1999 | B60P 7/13 |
| EP | 3508422 | 7/2019 | |
| FR | 2918640 | 1/2009 | |
| FR | 2918641 | 1/2009 | |
| GB | 2436715 | 10/2007 | |
| GB | 2440062 A * | 1/2008 | B64D 9/003 |
| WO | 2004054876 | 7/2004 | |

OTHER PUBLICATIONS

USPTO, Non-Final Office Action dated Jun. 27, 2019 in U.S. Appl. No. 15/866,241.

European Patent Office, European Search Report dated Jun. 26, 2020 in Application No. 19213585.3.

USPTO, Notice of Allowance dated Dec. 17, 2019 in U.S. Appl. No. 15/866,241.

European Patent Office, European Search Report dated Jul. 10, 2020 in Application No. 19214487.1.

European Patent Office, European Search Report dated Jul. 21, 2020 in Application No. 19216272.5.

USPTO, Pre-Interview First Office Action dated Sep. 30, 2020 in U.S. Appl. No. 16/539,203.

* cited by examiner

RESTRAINT ASSEMBLY FOR CARGO SYSTEM

FIELD

The present disclosure relates to cargo systems, and more specifically to a longitudinal guide and lateral restraint assembly for cargo systems.

BACKGROUND

Cargo handling systems, such as those used by aircraft for transport of containerized cargo or pallets, commonly referred to as unit load devices (ULDs), typically include longitudinal trays containing transport rollers, latches, and/or power drive units (PDU's) positioned along a cargo bay floor to facilitate movement of the ULDs relative to the bay floor. For example, cargo may be loaded from an entrance of the aircraft and transported by the cargo system along a conveyance plane to forward or aft locations, depending upon the configuration of the aircraft.

Cargo systems may benefit from having one or more features to facilitate guidance and/or restraint of the cargo. For example, conventional cargo guidance/restraining systems may include a continuous vertical restraint lip that extends along a side of a track or guide rail. However, a system may require longitudinal guidance, lateral restraint, and/or vertical restraint of ULD's where one or both of the longitudinal edges of the ULD's are positioned such that the guidance and/or restraint is provided along a longitudinal tray.

SUMMARY

In various embodiments, the present disclosure provides a restraint assembly of a cargo system. As used herein, the term "restraint assembly" generally refers to an assembly that provides guidance and/or restraint to cargo. The restraint assembly comprises a base configured to be mounted to a tray of the cargo system, a lateral restraint, and a vertical restraint. As used herein, the lateral restraint may provide longitudinal guidance and/or lateral restraint to cargo, as described in greater detail below. The lateral restraint comprises a guide face and a top edge, wherein the lateral restraint is rotatably coupled to the base, according to various embodiments. The vertical restraint extends from the top edge of the lateral restraint, according to various embodiments. In various embodiments, the restraint assembly comprises a stored position and a raised position. In the stored position both the lateral restraint and the vertical restraint are configured to be disposed within a volume defined by the tray of the cargo system. In the raised position the vertical restraint and at least the guide face of the lateral restraint are configured to be disposed above the volume defined by the tray of the cargo system such that the restraint assembly provides at least one of longitudinal guidance, lateral restraining, and vertical restraining to cargo.

In various embodiments, a first rotational axis between the lateral restraint and the base is configured to extend perpendicular to a longitudinal axis of the tray of the cargo system. The first rotational axis between the lateral restraint and the base may be configured to be oblique relative to a conveyance plane of the cargo system. In various embodiments, a front edge of the vertical restraint, in the raised position, is configured to extend at least partially over a top surface of a rail of the tray of the cargo system.

The vertical restraint is rotatably coupled to the top edge of the lateral restraint, according to various embodiments. The second rotational axis between the vertical restraint and the lateral restraint may be perpendicular to the first rotational axis. In various embodiments, the second rotational axis between the vertical restraint and the lateral restraint is parallel to the longitudinal axis of the tray of the cargo system. The restraint assembly may further include a link configured to extend between the lateral restraint and the tray of the cargo system to reversibly lock the restraint assembly in the raised position. The vertical restraint may be unitary with and may extend integrally from the lateral restraint. In various embodiments, toggling between the stored position and the raised position comprises rotating the lateral restraint more than 90 degrees.

Also disclosed herein, according to various embodiments, is a cargo system comprising a tray and a restraint assembly. The tray defines a volume within which one or more rollers are housed. The rollers are configured to facilitate movement of cargo along a longitudinal axis the tray, according to various embodiments. The restraint assembly comprises a base mounted to the tray, a lateral restraint rotatably coupled to the base, and a vertical restraint extending from the lateral restraint, according to various embodiments. The restraint assembly also comprises a stored position and a raised position, wherein in the stored position the lateral restraint of the restraint assembly is disposed within the volume defined by the tray and in the raised position the lateral restraint of the restraint assembly is disposed above the volume defined by the tray of the cargo system such that the restraint assembly provides at least one of longitudinal guidance, lateral restraining, and vertical restraining to the cargo.

Also disclosed herein, according to various embodiments, is a method for guiding or restraining cargo. The method may include rotating a lateral restraint of a restraint assembly, relative to a tray of a cargo system, from a stored position to a raised position. The method may also include rotating a vertical restraint of the restraint assembly, relative to the lateral restraint, from the stored position to the raised position. In various embodiments, in the stored position the lateral restraint and the vertical restraint are disposed within a volume defined by the tray of the cargo system and in the raised position the vertical restraint and at least a guide face of the lateral restraint are disposed above the volume. In various embodiments, rotating the lateral restraint comprises rotating the lateral restraint, relative to a base mounted to the tray of the cargo system, about a first rotational axis. In various embodiments, rotating the vertical restraint comprises rotating the vertical restraint, relative to the lateral restraint, about a second rotational axis. In various embodiments, the first rotational axis is perpendicular to the second rotational axis.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the tail of an aircraft, or generally, to the direction of exhaust of the gas turbine. As used herein, "forward" refers to the direction associated with the nose of an aircraft, or generally, to the direction of flight or motion.

Cargo management systems, as disclosed herein, are used to load, move, and unload cargo. While numerous examples and details are included below with reference to aircraft cargo systems, it is expected that the present disclosure may apply to other, non-aircraft type cargo systems.

Figure 1:
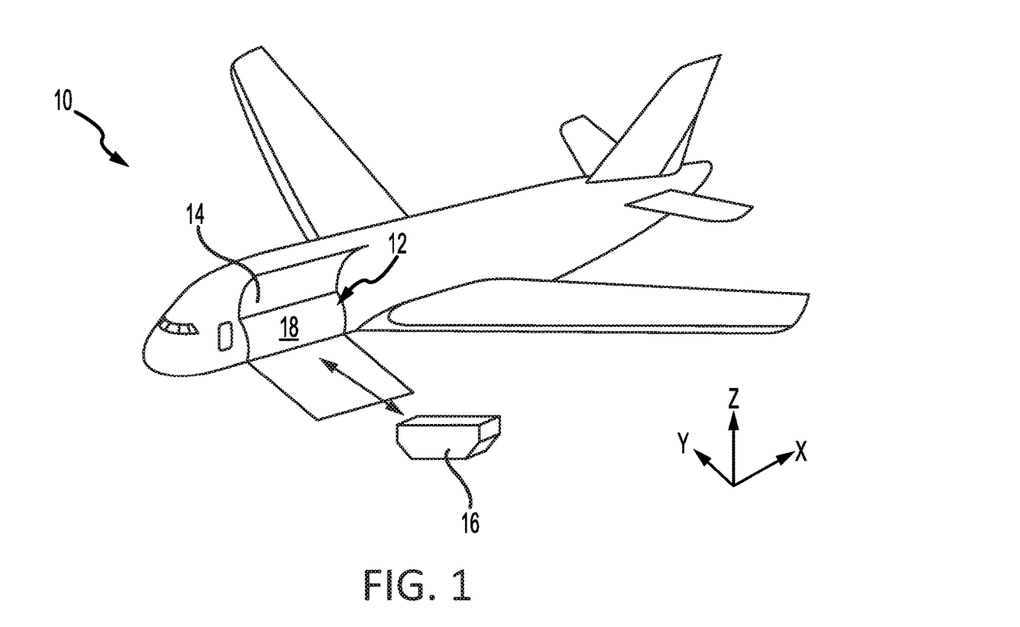
FIG. 1 illustrates a schematic view of an aircraft being loaded with cargo, in accordance with various embodiments.

With reference to FIG. 1, an aircraft 10 is illustrated having a cargo compartment 12. A cargo door 14 provides access to cargo compartment 12 from outside aircraft 10. Cargo 16 (e.g., pallets, ULDs, luggage, etc.) may be loaded and unloaded through cargo door 14 and onto a cargo deck 18 of aircraft 10. In various embodiments, cargo deck 18 of the cargo system may be equipped with one or more power drive units (PDUs) configured to propel cargo 16 across cargo deck 18 in a desired direction.

Figure 2:
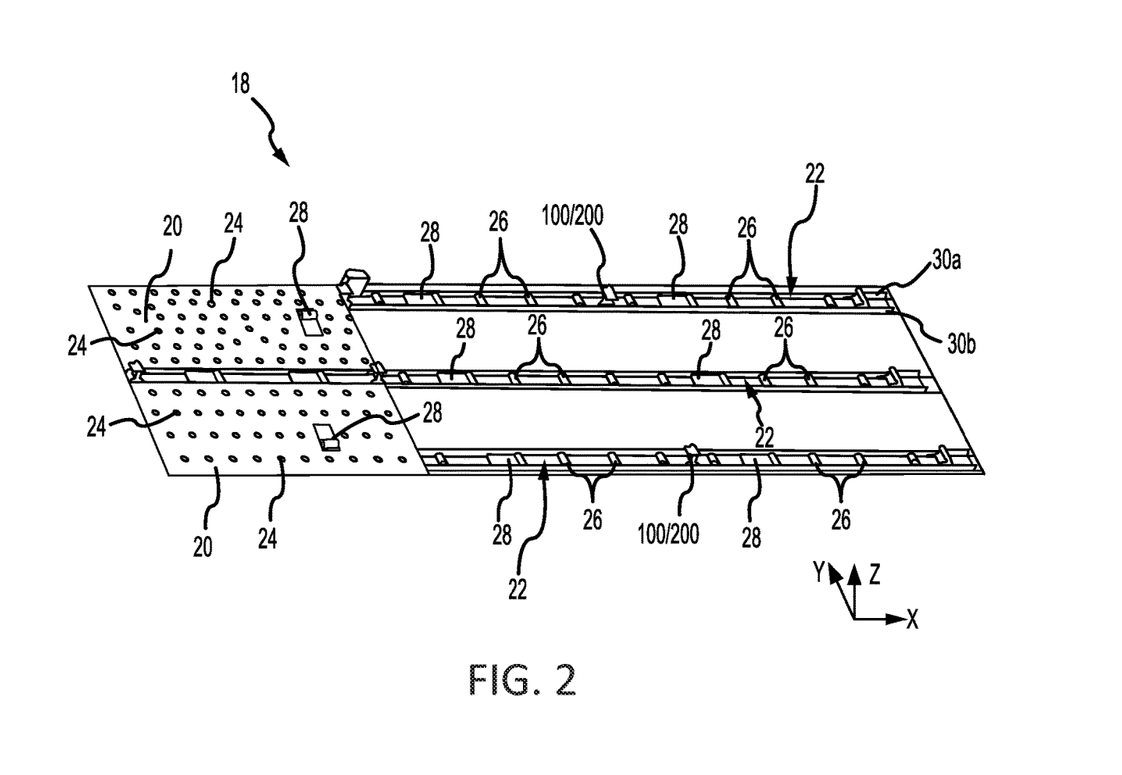
FIG. 2 illustrates a portion of an aircraft cargo deck, in accordance with various embodiments.

With reference to FIG. 2, a portion of cargo deck 18 is illustrated in greater detail. Cargo deck 18 may include one or more ball mats 20 and one or more trays 22. Ball mats 20 may include a plurality of freely rotating conveyance balls 24 and trays 22 may include a plurality of freely rotating conveyance rollers 26. In various embodiments, a number of PDUs 28 may be mounted along cargo deck 18. For example, PDUs 28 may be located in ball mats 20 and/or in roller trays 22. PDUs 28 may be configured to propel cargo over conveyance balls 24 and/or conveyance rollers 26 and across cargo deck 18. In accordance with various embodiments, a number of restraint assemblies 100 may be located along cargo deck 18. The restraint assemblies 100 generally provide longitudinal guidance and/or restraint to cargo items, such as ULDs. Accordingly, the term "restraint assembly" refers generally to an apparatus, device, or system that provides guidance and/or restraint to cargo. That is, the embodiments of the restraint assemblies 100/200 provided herein may be configured to provide guidance to cargo as it moves along the cargo system, to restrain and retain cargo once it is in a desired position, or to provide both guidance and restraint to cargo. The restraint assemblies 100 may be mounted to the trays 22, or could otherwise be implemented and/or mounted relative to a panel, a hogout, or other structure of a cargo system. For example, restraint assemblies 100 may be installed between a first rail 30a and a second rail 30b of tray 22. Second rail 30b may be parallel to first rail 30a. As described in greater detail below, the restraint assemblies 100 can be in a stored position when not needed, and can be transitioned to a raised position when cargo guidance/restraint is desired. In various embodiments, the trays 22 are coupled/mounted to an airframe of the aircraft.

In the stored position, the restraint assemblies 100 are disposed below/beneath the conveyance plane, which is defined as the plane tangent to the top of the conveyance rollers. For example, the restraint assemblies 100 may be disposed below/beneath the conveyance plane (e.g., in a volume 80 defined between first and second rails 30a, 30b that comprise the tray 22) in the stored position. In the raised position, the restraint assemblies 100 are disposed above the conveyance plane (e.g., above the volume 80 defined between first and second rails 30a, 30b that comprise the tray 22). As used herein, the term "volume" refers to the space bounded below the conveyance plane, and the conveyance plane is defined as the plane that is tangent to the top of the conveyance rollers. As used herein, the terms "beneath" or "below" refer to the negative Z-direction, and the term "above" refers to the positive Z-direction with respect to the conveyance surface/plane. In the raised position, the one or more restraint assemblies 100 provide longitudinal guidance, lateral restraint, and vertical restraint. As used herein, the term "longitudinal" refers to directions along the x-axis, the term "lateral" refers to directions along the y-axis, and the term "vertical" refers to directions along the z-axis. The restraint assemblies 100 may be held or biased in either the stored or raised position (e.g., spring-loaded or latched). The restraint assemblies 100 may be controlled using actuators (e.g., motor driven actuators) and the restraint assemblies 100 may be reversibly locked into either position. The restraint assembly 100 may include a controller and a motor. In various embodiments, the restraint assembly 100 may be in mechanical communication with the restraint motor, which may be, for example, an electromagnetic, electromechanical or electrohydraulic actuator or other servomechanism. In various embodiments, the controller is configured to control operation of the restraint assembly 100. The restraint controller may include a processor and a tangible, non-transitory memory. The processor may comprise one or more logic modules that implement logic to control operation of the restraint assembly (e.g., switching between the stored and the raised positions).

In various embodiments, a human operator manipulates control elements to selectively and mechanically or electrically actuate the restraint assemblies 100. For example, the a restraint assembly 100 may be actuated by a lever, a latch, or other mechanical features disposed in proximity to the restraint assembly 100 (e.g., hand or foot operable). The user/control interface may be mounted on a wall or other structure within the cargo bay or may be portable, e.g., the controls may be in a hand held device. In various embodiments, the cargo system may include one or more cargo shuttles that are configured to slide across floor panels or roll across the conveyance rollers 26. In various embodiments, the system controller may include a general purpose processor, a digital signal processor (DSP), an application specific integrated circuit (ASIC), a field programmable gate array (FPGA) or some other programmable logic device, discrete gate or transistor logic, discrete hardware components, or any combination thereof. The cargo handling system may also include a power source configured to supply power to the restraint assemblies 100 via one or more power busses.

Figure 3A:
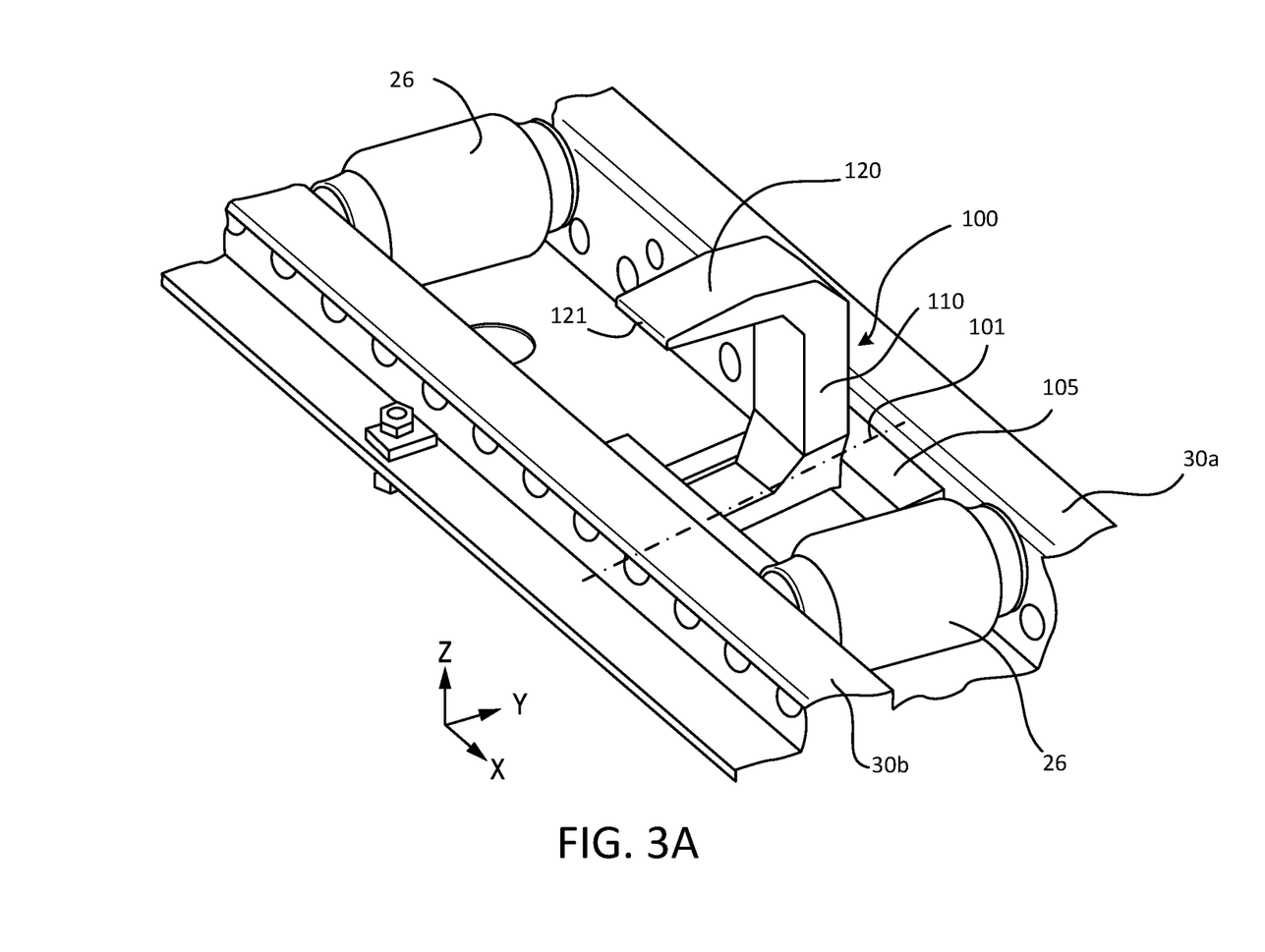
FIG. 3A illustrates a restraint assembly, in a raised position, installed in a tray of a cargo system, in accordance with various embodiments.
Figure 3B:
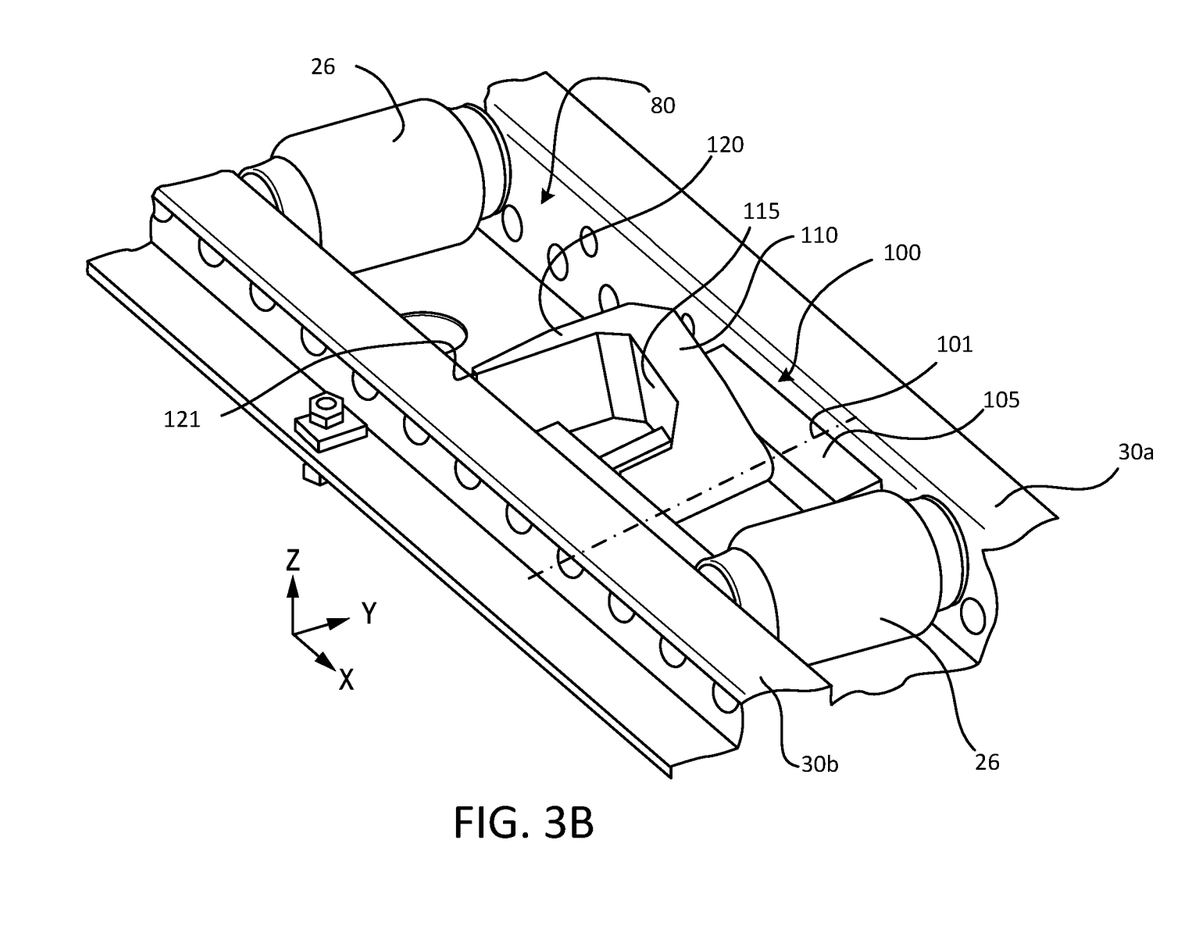
FIG. 3B illustrates a restraint assembly, in a stored position, installed in a tray of a cargo system, in accordance with various embodiments.
Figure 4:
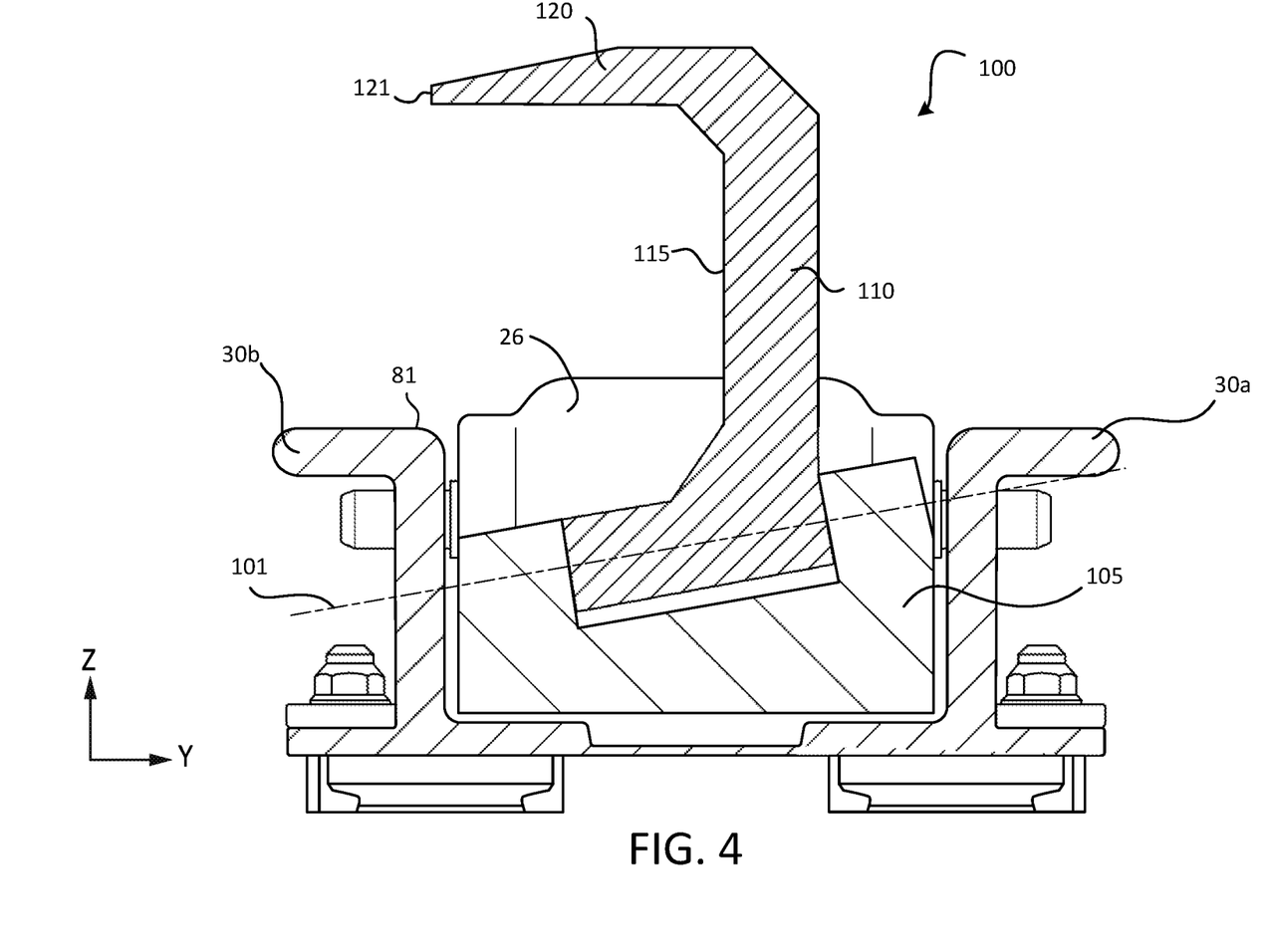
FIG. 4 illustrates a cross-sectional view of a restraint assembly, in a raised position, installed in a tray of a cargo system, in accordance with various embodiments.

With reference to FIGS. 3A, 3B, and 4, the restraint assembly 100 generally includes a base 105, a lateral restraint 110, and a vertical restraint 120. The term "lateral restraint" 110 refers generally to the portion of the restraint assembly 100 that provides lateral restraint and/or longitudinal guidance to the cargo (i.e., the modifier "lateral" does not refer to the orientation or extension direction of the restraint). That is, the lateral restraint 110 may provide guidance to cargo as it moves along the cargo system, may retain or restrain cargo once it is in a desired position, or may provide both guidance and restraint to cargo. The term "vertical restraint" refers generally to the portion of the restraint assembly 100 that provides vertical restraint (i.e., the modifier "vertical" does not refer to the orientation or extension direction of the restraint). In FIGS. 3A and 4, the restraint assembly 100 is shown in a raised position (e.g., deployed position). The lateral restraint 110 includes a guide face 115 configured to engage lateral sides of cargo, such as ULDs, to provide longitudinal guidance while conveying the cargo and/or to provide lateral restraint to the cargo.

In various embodiments, and with reference to FIGS. 3A, 3B, and 4, the base 105 is mounted to the tray between the rails 30a, 30b. The lateral restraint 110 is rotatably coupled (e.g., via a first rotational axis 101) to the base 105. The first rotational axis 101 may be perpendicular to the longitudinal axis of the tray (e.g., may be perpendicular to the direction in which cargo is configured to be conveyed along the trays). As shown in FIG. 4, the first rotational axis 101 may be oblique relative to a conveyance plane of the cargo system. That is, the first rotational axis 101 may extend perpendicular to the longitudinal axis of the tray but at an angle relative to the y-axis. In various embodiments, the first rotational axis 101 may also be skewed into or out of the page. Accordingly, the first rotational axis may be tilted/skewed relative to the standard xyz axes. By orienting the first rotational axis in this tilted manner, a front edge 121 of the vertical restraint 120 may at least partially overlap the rail 30b in the raised position while also being stowable in the stored position within the cavity/volume 80 defined by the tray. That is, if the first rotational axis 101 were not tilted in this manner and if at least the front edge 121 of the vertical restraint 120 extended over a top surface 81 of the rail 30b in the raised position, the restraint assembly 100 would collide with the rail 30b upon trying to rotate the restraint down to the stored position. In various embodiments, and with reference to FIG. 3B, the restraint assembly 100 is shown in the stored position, with both the lateral restraint 110 and the vertical restraint 120 disposed within a volume defined by the tray (i.e., within a volume 80 defined between the two rails 30a, 30b). Toggling between the stored position and the raised position may comprise rotating the lateral restraint more than 90 degrees. That is, the restraint assembly 100 may be configured to provide more than 90 degrees of rotational movement of the lateral restraint to ensure the lateral restraint 110 is sufficiently below the conveyance plane. In various embodiments, the vertical restraint 120 is unitary with and integrally extends from the lateral restraint 110.

Figure 5A:
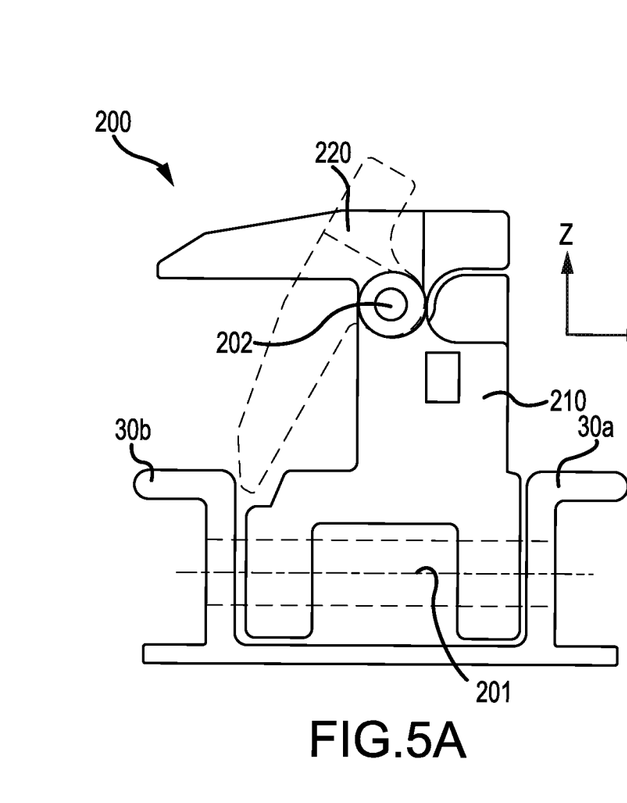
FIGS. 5A and 5B illustrate views of a restraint assembly having a rotatable vertical restraint, in accordance with various embodiments.
Figure 5B:
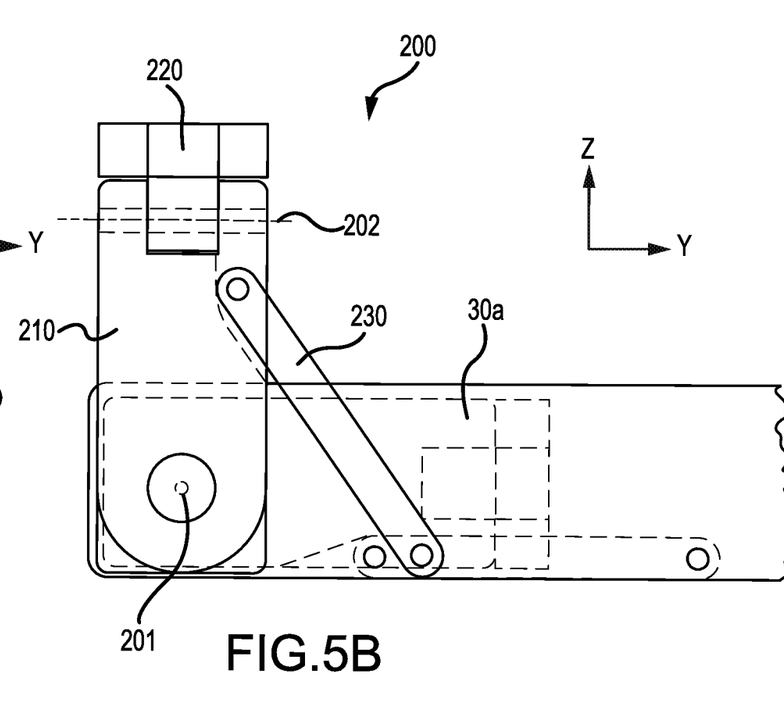

In various embodiments, and with reference to FIGS. 5A and 5B, the vertical restraint 220 is rotatably coupled to the lateral restraint 210 via a second rotational axis 202. The second rotational axis 202 may be parallel to the longitudinal axis of the tray (e.g., may be parallel to the direction in which cargo is configured to be conveyed along the trays). In various embodiments, this coupling between the lateral restraint 210 and the vertical restraint 220 is along a top edge 212 of the lateral restraint 210 (e.g., a top edge of the guide face 215). Because of the rotational coupling between the lateral restraint 210 and the vertical restraint 220, the vertical restraint 220 can be rotated to provide vertical restraining force to cargo. The second rotational axis 202 may be perpendicular to the first rotational axis 201.

In various embodiments, and with continued reference to FIGS. 5A and 5B, the restraint assembly 200 may include a link 230. The link 230 may extend between the lateral restraint 210 and the tray (e.g., rail 30a) of the cargo system to reversibly lock the restraint assembly 200 in the raised position. In various embodiments, restraints 210, 220 may be independently or sequentially deployed. In various embodiments, the lateral restraint 210 and the vertical restraint 220 may transition between the stored and raised positions together. That is, actuation of the lateral restraint 210 may automatically trigger actuation of the vertical restraint 220 (or vice-versa).

Figure 6:
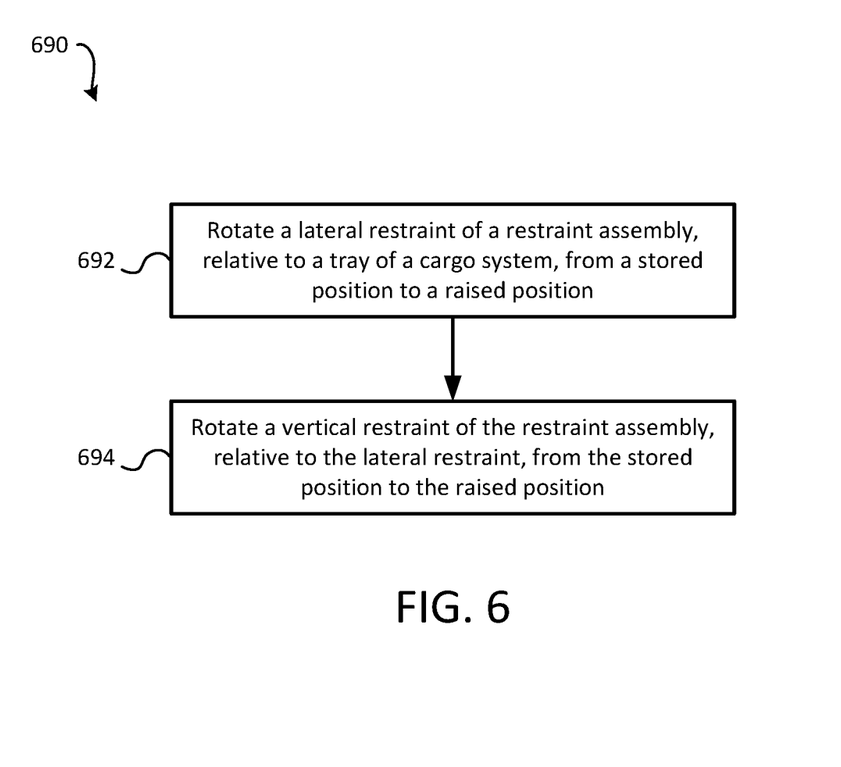
FIG. 6 is a schematic flow chart diagram of a method for guiding and/or restraining cargo, in accordance with various embodiments.

In various embodiments, and with reference to FIG. 6, a method 690 for guiding and/or restraining cargo is provided. The method 690 may include rotating a lateral restraint of a restraint assembly, relative to a tray of a cargo system, from a stored position to a raised position at step 692. The method may also include rotating a vertical restraint of the restraint assembly, relative to the lateral restraint, from the stored position to the raised position at step 694. In the stored position the lateral restraint and vertical restraint are disposed within a volume defined by the tray of the cargo system and in the raised position the vertical restraint and at least a guide face of the lateral restraint are disposed above the volume. In various embodiments, step 692 is performed about a first rotational axis, step 694 is performed about a second rotational axis, and the first rotational axis and the second rotational axis are perpendicular to each other.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A restraint assembly of a cargo system, the restraint assembly comprising:
   a base configured to be mounted to a tray of the cargo system;
   a lateral restraint comprising a guide face and a top edge, wherein the lateral restraint is rotatably coupled to the base; and
   a vertical restraint extending from the top edge of the lateral restraint;
   wherein:
      the restraint assembly is configured to have a stored position and a raised position;
      in the stored position both the lateral restraint and the vertical restraint are configured to be disposed within a volume defined by the tray of the cargo system;
      in the raised position the vertical restraint and at least the guide face of the lateral restraint are configured to be disposed above the volume defined by the tray of the cargo system such that the restraint assembly provides at least one of longitudinal guidance, lateral restraining, and vertical restraining to cargo;
      a first rotational axis between the lateral restraint and the base is configured to extend perpendicular to a longitudinal axis of the tray of the cargo system; and
      the first rotational axis between the lateral restraint and the base is configured to be oblique relative to a conveyance plane of the cargo system.

2. The restraint assembly of claim 1, wherein a front edge of the vertical restraint, in the raised position, is configured to extend at least partially over a top surface of a rail of the tray of the cargo system.

3. The restraint assembly of claim 1, wherein the vertical restraint is rotatably coupled to the top edge of the lateral restraint.

4. The restraint assembly of claim 3, wherein a second rotational axis between the vertical restraint and the lateral restraint is perpendicular to the first rotational axis.

5. The restraint assembly of claim 3, wherein a second rotational axis between the vertical restraint and the lateral restraint is parallel to the longitudinal axis of the tray of the cargo system.

6. The restraint assembly of claim 1, wherein the restraint assembly further comprises a link configured to extend between the lateral restraint and the tray of the cargo system to reversibly lock the restraint assembly in the raised position.

7. The restraint assembly of claim 1, wherein the vertical restraint is unitary with and integrally extends from the lateral restraint.

8. The restraint assembly of claim 1, wherein toggling between the stored position and the raised position comprises rotating the lateral restraint more than 90 degrees.

9. A cargo system comprising:
   a tray defining a volume within which a roller is housed, wherein the roller is configured to facilitate movement of cargo along a longitudinal axis of the tray; and
   a restraint assembly comprising a base mounted to the tray, a lateral restraint rotatably coupled to the base, and a vertical restraint extending from the lateral restraint, the restraint assembly comprising a stored position and a raised position, wherein in the stored position the lateral restraint of the restraint assembly is disposed within the volume defined by the tray and in the raised position the lateral restraint of the restraint assembly is disposed above the volume defined by the tray of the cargo system such that the restraint assembly provides at least one of longitudinal guidance, lateral restraining, and vertical restraining to cargo
   wherein a first rotational axis between the lateral restraint and the base extends perpendicular to the longitudinal axis of the tray of the cargo system;

wherein the vertical restraint is rotatably coupled to the top edge of the lateral restraint; and wherein a second rotational axis between the vertical restraint and the lateral restraint is parallel to the longitudinal axis of the tray of the cargo system.

10. The cargo system of claim 9, wherein the first rotational axis between the lateral restraint and the base is oblique relative to a conveyance plane of the cargo system.

11. The cargo system of claim 10, wherein a front edge of the vertical restraint, in the raised position, is configured to extend at least partially over a top surface of a rail of the tray of the cargo system.

12. The cargo system of claim 9, wherein:

the lateral restraint comprises a guide face and a top edge; and the vertical restraint extends from the top edge of the lateral restraint.

13. A method for guiding or restraining cargo, the method comprising:

rotating a lateral restraint of a restraint assembly, relative to a tray of a cargo system, from a stored position to a raised position; and rotating a vertical restraint of the restraint assembly, relative to the lateral restraint, from the stored position to the raised position;

wherein in the stored position the lateral restraint and the vertical restraint are disposed within a volume defined by the tray of the cargo system and in the raised position the vertical restraint and at least a guide face of the lateral restraint are disposed above the volume, wherein:

rotating the lateral restraint comprises rotating the lateral restraint, relative to a base mounted to the tray of the cargo system, about a first rotational axis;

rotating the vertical restraint comprises rotating the vertical restraint, relative to the lateral restraint, about a second rotational axis;

the first rotational axis is perpendicular to the second rotational axis; and the first rotational axis extends perpendicular to a longitudinal axis of the tray of the cargo system and the second rotational axis is parallel to the longitudinal axis of the tray of the cargo system.

* * * * *